United States Patent [19]

Boyesen

[11] 4,395,978

[45] Aug. 2, 1983

[54] FUEL PORTING FOR TWO-CYCLE INTERNAL COMBUSTION ENGINE

[75] Inventor: Eyvind Boyesen, Kempton, Pa.

[73] Assignee: Performance Industries, Inc., Kempton, Pa.

[21] Appl. No.: 292,635

[22] Filed: Aug. 13, 1981

Related U.S. Application Data

[63] Continuation-in-part of Ser. No. 133,098, Mar. 24, 1980, which is a continuation-in-part of Ser. No. 941,596, Sep. 12, 1978, Pat. No. 4,202,298, which is a continuation-in-part of Ser. No. 859,476, Dec. 12, 1977, Pat. No. 4,143,626, which is a continuation of Ser. No. 839,180, Oct. 4, 1977, Pat. No. 4,161,163, which is a continuation-in-part of Ser. No. 674,102, Apr. 6, 1976, Pat. No. 4,062,331, which is a continuation-in-part of Ser. No. 586,138, Jun. 11, 1975, Pat. No. 4,051,820, which is a continuation-in-part of Ser. No. 375,065, Jun. 29, 1973, Pat. No. 3,905,340, which is a continuation-in-part of Ser. No. 282,734, Aug. 22, 1972, abandoned, and a continuation-in-part of Ser. No. 361,407, May 18, 1973, abandoned.

[51] Int. Cl.³ ....................... F02B 33/04; F16K 15/16

[52] U.S. Cl. ............................ 123/73 R; 123/73 AA; 123/73 PP

[58] Field of Search .............. 123/73 PP, 73 A, 73 R, 123/73 AA, 73 B, 74 B, 74 A, 74 R

[56] References Cited

U.S. PATENT DOCUMENTS

| | | | |
|---|---|---|---|
| 4,051,820 | 10/1977 | Boyeson | 123/73 A |
| 4,062,331 | 12/1977 | Boyeson | 123/73 A |
| 4,178,886 | 12/1979 | Uchinishi | 123/73 A |
| 4,228,770 | 10/1980 | Boyeson | 123/73 A |
| 4,235,206 | 11/1980 | Boyeson | 123/73 A |
| 4,261,306 | 4/1981 | Gorr | 123/73 A |

*Primary Examiner*—Wendall E. Burns
*Attorney, Agent, or Firm*—John T. Synnestvedt; Kenneth P. Synnestvedt

[57] ABSTRACT

Two-cycle internal combustion engines are disclosed incorporating intake and transfer ports and passages, and including intake porting at the sides of the cylinder in the regions of an axial plane through the cylinder containing the axis of the wrist pin interconnecting the piston with the crank.

11 Claims, 7 Drawing Figures

FIG. 4.
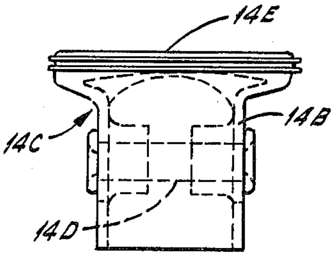
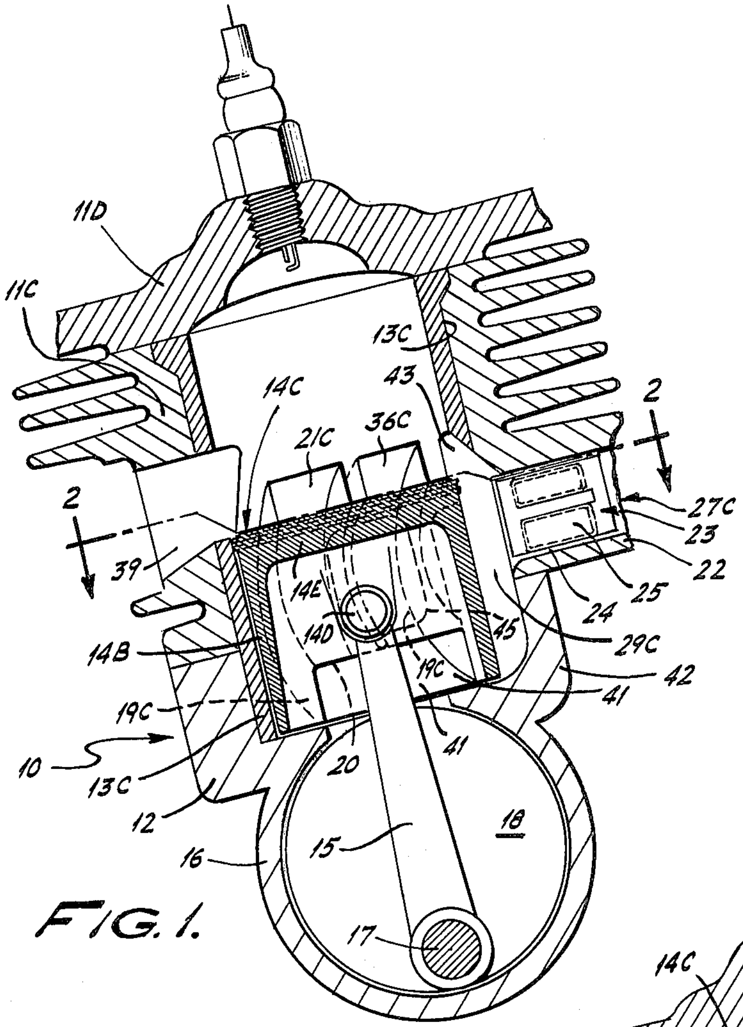
FIG. 1.
FIG. 3.
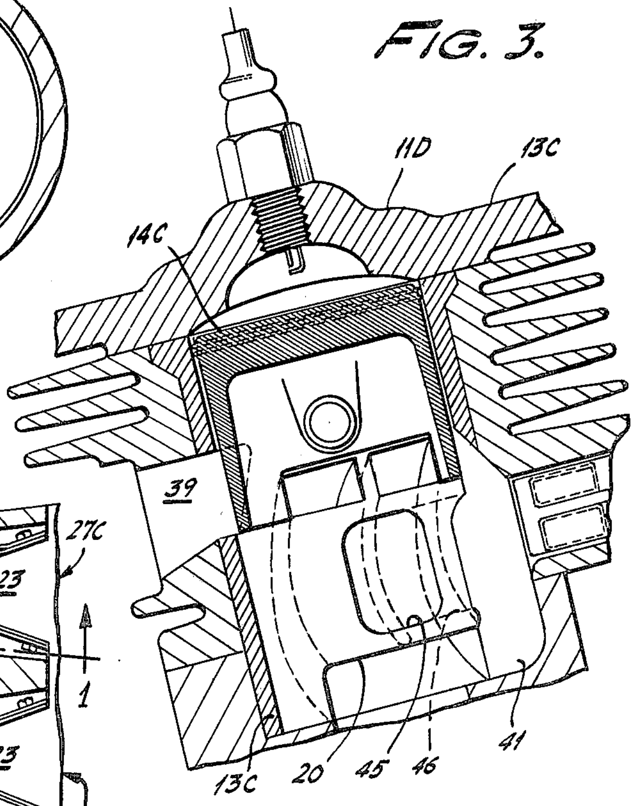
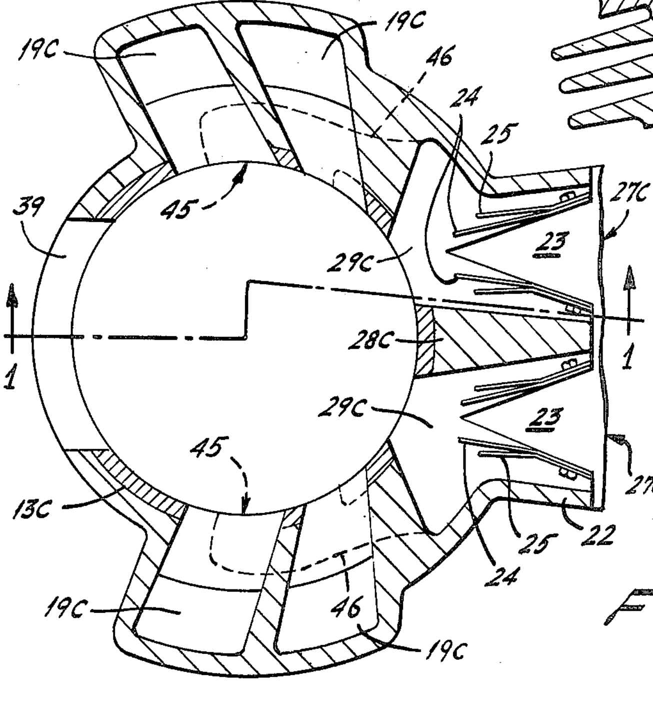
FIG. 2.

FUEL PORTING FOR TWO-CYCLE INTERNAL COMBUSTION ENGINE

CROSS REFERENCES

The present application is a continuation-in-part of application Ser. No. 133,098, filed Mar. 24, 1980, which is a continuation-in-part of application Ser. No. 941,596, filed Sept. 12, 1978, and issued May 13, 1980 as U.S. Pat. No. 4,202,298, which is a continuation-in-part of application Ser. No. 859,476, filed Dec. 12, 1977, and issued Mar. 13, 1979 as U.S. Pat. No. 4,143,626, which is a continuation of application Ser. No. 839,180, filed Oct. 4, 1977, and issued July 17, 1979 as U.S. Pat. No. 4,161,163, and which is a continuation-in-part of application Ser. No. 674,102, filed Apr. 6, 1976, and issued Dec. 13, 1977 as U. S. Pat. No. 4,062,331, which is a continuation-in-part of Ser. No. 586,138, filed June 11, 1975, and issued Oct. 4, 1977 as U.S. Pat. No. 4,051,820, which, in its turn, is a continuation-in-part of my application Ser. No. 375,065, filed June 29, 1973, and issued Sept. 16, 1975 as U.S. Pat. No. 3,905,340, which, in its turn, is a continuation-in-part of my prior application Ser. No. 282,734, filed Aug. 22, 1972, now abandoned, and also of my prior application Ser. No. 361,407, filed May 18, 1973, now abandoned.

BACKGROUND AND STATEMENT OF OBJECTS

The invention is particularly concerned with two-cycle internal combustion engines which are commonly provided with transfer passages and porting providing for delivery of fuel from the crankcase into the combustion chamber above the piston. Intake porting is provided in order to introduce fuel into the crankcase space for compression therein upon the downward stroke of the piston and for delivery from the crankcase space through the transfer passage means. Intake valves are commonly provided in the intake passageway or intake tract.

In two-cycle engines of the kind referred to, a crankshaft is provided, being housed in a crankcase below the cylinder, and the crankshaft is connected with the piston working in the cylinder by means of a wrist pin, the axis of which parallels the axis of the crankshaft. This geometry of these parts is well-known; and it is also known that with this geometry, the body of the piston is positioned and supported during its reciprocation in the cylinder by interengagement of surfaces of the piston with the cylinder wall. The principal guiding support for the piston in the cylinder is derived from interengagement of surfaces of the piston body with the cylinder wall in areas concentrated in a plane perpendicular to the axis of the wrist pin; and the wear at the inner surface of the cylinder is correspondingly concentrated in the areas of the cylinder wall concentrated in the plane perpendicular to the wrist pin.

In conventional two-cycle engines, for various reasons, it is very common to employ a fuel intake port in the cylinder wall in the region of the plane perpendicular to the wrist pin, in consequence of which the available surface within the cylinder for supporting and guiding the piston is reduced in proportion to the area of the intake port or ports.

The above interrelationship between the position of the intake port and the plane perpendicular to the wrist pin has been found to be convenient in various types of equipment, such as motorcycles, chain saws and other devices, for a variety of reasons, including the fact that the fuel supply system, including for example, a carburetor, intake passage and valves are also conveniently located in positions generally in the plane perpendicular to the axis of the wrist pin.

In efforts to increase the power of the engine, there has been a tendency to multiply or increase the size of the intake port or ports, and to locate such ports in positions which at least in large part confront the piston through at least a substantial part of the piston stroke; and in consequence, the increase in the intake area tends to reduce the surface area of the cylinder serving to guide or support the piston. One undesirable consequence of this is the increase in wear of the remaining areas of the cylinder wall adjacent to the intake port or ports.

Having the foregoing in mind, the present invention contemplates an arrangement in which at least a part of the intake porting is provided in the cylinder wall in the region of the axial plane of the wrist pin, instead of in a region of the axial plane perpendicular to the wrist pin. By locating intake porting in this manner, relatively large intake ports may be provided without impairing the guiding or supporting function of the surfaces of the cylinder lying in the plane perpendicular to the wrist pin. In the arrangement of the invention, it is further contemplated that for purposes of providing communication between the intake porting and the crankcase, the body of the piston is constructed so that the surfaces thereof are spaced away from the cylinder wall in the regions adjoining the axial plane of the wrist pin. In this way, large intake port area may be provided without appreciably impairing the guiding or support of the piston in the cylinder, with consequent reduction in the wear of the cylinder, even when employing increased intake port area.

It is contemplated according to the invention that this "laterally" positioned intake porting may, if desired, be employed in combination with at least some intake porting lying within the plane perpendicular to the axis of the wrist pin. Moreover, it is further contemplated that the laterally positioned intake porting may be supplied with fuel for admission to the engine through passages extended circumferentially through the cylinder wall toward a position in the region of the plane perpendicular to the axis of the wrist pin, in which position a fuel supply chamber, appropriate valves, carburetor, etc. may conveniently be arranged.

By the intake port system of the present invention, it is possible to still further increase the total intake porting area without seriously affecting the support or guiding of the piston in the cylinder.

The present invention is also concerned with improvements in the interrelationship of the porting and the passage arrangements described above in relation to other porting and passage means, such as the transfer ports and passages commonly employed in two-cycle engines. These improvements may still further enhance the delivery of fuel into the combustion chamber and thereby increase the power of the engine.

The increase in fuel delivery and the consequent improvement in operation of the engine are accomplished according to the present invention by providing a novel interrelationship between the intake porting and passages and the transfer porting and passages, according to which the intake porting and passages not only deliver the fuel to the crankcase space, but also deliver fuel by an injector type of action into the transfer fuel flow during the phase of the cycle of operation in which fuel is being transferred from the crankcase to the combustion chamber.

In the arrangements according to the present invention, reed type intake valves are preferably provided in the intake tract, and injector porting or passages are provided in order to deliver fuel from the intake tract substantially directly into the transfer passage means. According to the invention, this may be accomplished in several ways by providing a region of at least one transfer passage intermediate its ends in communication with the intake passage or tract downstream of the valve means. Indeed, in certain arrangements according to the invention, a region of the intake tract downstream of the valve means and a region of at least one transfer passage intermediate its ends are common to each other.

Several embodiments of engines providing improved operation in various aspects as referred to above are illustrated in the accompanying drawings and described hereinafter.

BRIEF DESCRIPTION OF DRAWINGS

FIG. 1 is a view in section, taken along the line 1—1 of FIG. 2, and illustrating a two-cycle reed valve engine having intake and injector porting according to one embodiment;

FIG. 2 is a sectional view taken along the line 2—2 of FIG. 1;

FIG. 3 is a fragmentary view similar to FIG. 1 but illustrating the piston in top dead center position, thereby uncovering the lateral intake porting;

FIG. 4 is an elevational view of the piston of the embodiment of FIGS. 1, 2 and 3, taken in a direction at right angles to the illustration in FIGS. 1 and 3.

DETAILED DESCRIPTION

FIGS. 1 to 4

Figure 5:
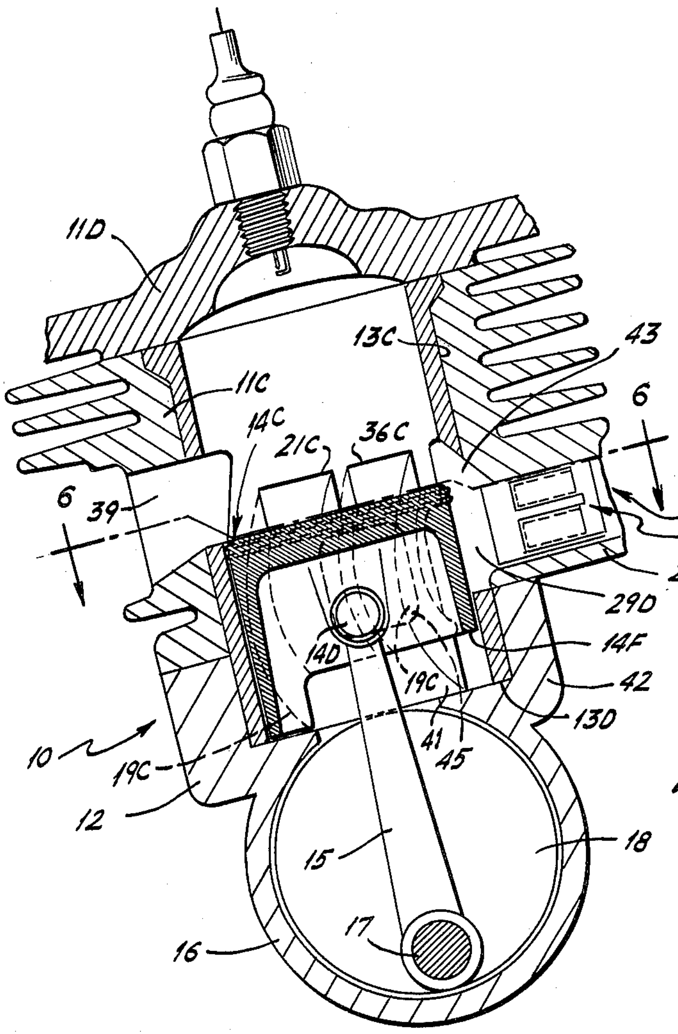
FIGS. 5, 6 and 7 are views similar to FIGS. 1, 2 and 4, and illustrating an embodiment of an engine similar to that of FIGS. 1 to 4, but incorporating a modified arrangement of porting and passages hereinafter fully described.

Before considering the drawings in detail, it is first pointed out that FIGS. 1 and 2 are respectively similar to FIGS. 1 and 2 of my prior application Ser. No. 133,098 and to FIGS. 5 and 6 of my prior application Ser. No. 941,596, issued as U.S. Pat. No. 4,202,298, identified above. Since some of the structure of these figures is shown and described in the companion applications referred to, reference may be had to said companion applications for various details. Significant parts of the apparatus shown in these figures are also described herebelow, and certain portions of this description correspond to portions appearing in the companion application where the structural features are the same.

In FIGS. 1 to 4, there is shown a somewhat diagrammatic representation of a two-cycle engine comprised of a housing 10 the upper portion of which comprises a cylinder casting 11C and the lower portion of which comprises a crankcase casting 12. The upper, annular portion of the crankcase interfits with cylinder line structure 13C, which extends throughout the height of the cylinder casting 11C, except where omitted or removed to provide certain porting (including the usual exhaust port 39), and projects beneath it in the manner plain from FIG. 1. While the use of a liner is preferred, it is not essential, and for most purposes of the present invention, the liner can be considered as a part of the cylinder casting 11C, which, in turn, forms the upper portion of housing 10. A cylinder head 11D closes the top of the cylinder. A piston indicated generally at 14C is mounted for reciprocation within the cylinder and its connecting rod 15 is eccentrically mounted upon the crankshaft within the lower portion 16 of the crankcase, as indicated at 17, the wrist pin which interconnects the connecting rod and the piston being indicated at 14D. As is conventional, a circular counterweight is preferably employed, as shown at 18.

The cylinder 11C includes transfer passages 19C, two being provided at each side of the cylinder in this embodiment, the lower end of each of which is in open communication with the crankcase and the upper end of each of which terminates in a transfer port, one of which is indicated at 21C and another of which is indicated at 36C. A similar pair is provided at the opposite side of the cylinder. The transfer ports are exposed in the cylinder above the piston when the piston is in bottom dead center position. Conveniently, and as shown, the passages 19C are provided in the wall of cylinder casting 11C, lying behind the liner 13C, which is apertured to provide the lower communication at 20 as well as the upper ports 21C and 36C. As is conventional, combustible gases inletted during the upward stroke are pressurized beneath the piston and in the crankcase by the piston throughout its downward stroke toward the bottom dead center position illustrated, and the gases flow from the crankcase through openings 20, passages 19C and ports 21C and 36C, from whence the gases enter the cylinder above the piston 14C.

The cylinder 11C also includes an intake chamber 22 which leads to a source of fuel, such as a carburetor (not illustrated), and which chamber contains the reed valve means 23, which is adapted to open and provide for intake of fuel throughout the entire upward stroke of the piston, and to close, during the downward stroke of the piston, when the fuel inletted into the space below the piston is being compressed. While, for certain purposes of the present invention, the reed valve means 23 may take a variety of forms known in the art, it is preferred that said reed valve means be of the so-called "vented" type described and claimed in my earlier disclosures and particularly in U.S. Pat. No. 3,905,340, to which reference may be had for a more detailed description. It is also preferred that the valve means include a plurality of valve assemblies as described hereinafter.

In the embodiment illustrated in FIGS. 1 to 4, the reed valve means 23 includes a reed valve body or cage of wedge shape, with the base end of the wedge interiorly open to the fuel supply passage, each inwardly inclined surface of the wedge-shaped cage having a pair of valve ports and each such port provided with primary and secondary reeds 24 and 25, the primary reeds being vented. This valving arrangement is more fully illustrated and described in my U.S. Pat. No. 3,905,340 above identified. The opposite sides or ends (top and bottom) of the reed valve cage are provided with parallel triangular walls.

From FIG. 2, it will be seen that the embodiment of FIGS. 1 to 4 includes two valve assemblies 23 arranged in side-by-side relation and positioned respectively in separate intake passages 27C,27C lying at opposite sides of the dividing wall 28C. The fuel entering through the valves 24, 25 flows directly into the cylinder intake passages 29C which have intake ports in the cylinder wall, and also laterally into additional intake passages to be described.

It is desirable, as shown in FIGS. 1 and 2, that each reed cage be positioned with its apex extended in a vertical direction, i.e., in a direction parallelling the axis of the cylinder. When positioned in the manner just referred to, it will be clear from inspection of FIG. 2 that the flow of fuel through the valve ports controlled by the reed valves or petals 24 and 25, substantially directly enters the passages downstream of the valves, without the necessity for any extensive or sharp angular deflection. These and other factors are of importance in maximizing the input of fuel into the engine.

The above mentioned directness of flow is enhanced by virtue of the arrangement as shown in which a pair of reed valve assemblies are mounted in separate generally parallel intake passages 27C, 27C, as established by intervening wall structure including partition 28C.

It will be seen from inspection of FIGS. 1 and 2 that the arrangement here shown not only includes two transfer passages 19C at each side of the cylinder, but also includes a combined intake and transfer passage at each side. The combined intake and transfer passages are described below but it is first pointed out that the transfer passages are provided with appropriate ports into the combustion space and also have their lower ends communicating with a chamber 41 formed within the portion 12 of the engine housing 10, this chamber also communicating with the lower portion of the crankcase but being located above the crank and counterweight space immediately adjacent to the lower ends of the transfer passages. As shown, the piston skirt is cut out at opposite sides adjacent to the lower ends of the transfer passages 19C, thereby providing for communication of the lower ends of the transfer passages with the fuel flow space 41.

As seen in FIGS. 1 and 2, the intake passages or tracts 29C downstream of the reed valves 23 have communication with the chamber 41 and the crankcase space at least throughout most of the piston stroke; and this communication is arranged within the wall structure 42 in such manner as to remain open throughout at least most of the cycle of operation of the engine. The intake passages or tracts 29C also extend upwardly for communication with the cylinder ports 43, one such port being provided for each of the passages 29C. These ports 43 are preferably positioned at substantially the same level in the cylinder as the ports 21C and 36C of the transfer passages 19C, and the ports 43 serve a similar function, but also directly communicate with the intake system just downstream of the valves. It will be observed that the intake passages 29C receive fuel from the valves 23 in a region above the chamber 41 and intermediate the ports 43 and the zone in which the passages 29C communicate with chamber 41 and the crankcase. Therefore, during the lower portion of the downward or compression stroke of the piston, the intake passages 29C serve to deliver compressed fuel from the chamber 41 and thus from the crankcase upwardly into the combustion chamber through the ports 43, in the general manner of a transfer passage, but since these passages 29C have communication with the fuel supply, at least at higher speeds of operation, additional fuel is supplied to the flow by virtue of the action referred to in various of the companion applications as the injector action.

It is also to be noted that since the chamber 41 in the immediate vicinity of the lower ends of the transfer passages 19C directly communicate with the intake passages or tracts 29C, under certain conditions of operation, the delivery of fuel into the combustion space through the transfer passages 19C is also augmented.

It will be noted that in effect at least a region of each passage 29C serves in part as an intake tract and in part as a transfer passage.

From the above, it will be seen that the embodiment of FIGS. 1 to 4 provides for intake of fuel from intake passages and ports located in the cylinder at the side thereof adjacent to a plane perpendicular to the wrist pin 14D (toward the right hand side of the cylinder as viewed in FIGS. 1, 2 and 3), which is the side of the cylinder toward which the intake passages 29C and the valve assemblies 23 are arranged. As hereinabove pointed out, the present invention also contemplates intake of fuel through one or more intake ports located in the region of the axial plane containing the axis of the wrist pin 14D. One of these additional intake ports appears in full lines in FIG. 3 at 45, this port being formed in the cylinder liner 13C. Another similar port is contemplated for use at the opposite "lateral" side of the piston and cylinder, also in the region of the axial plane containing the axis of the wrist pin 14D, but located at the opposite side. These additional intake ports may be supplied with fuel from the intake chambers 29C, 29C, downsteam of the valves 23,23, by means of passages 46 formed in the housing structure. The ports 45 are axially positioned in the cylinder so as to be completely open when the piston is in top dead center position (see FIG. 3); and these additional "lateral" intake ports also remain open to the space below the piston and to the crankcase throughout the entire cycle of the engine, including bottom dead center position of the piston. This is accomplished by the special configuration of the piston employed in accordance with the present invention and as illustrated in FIG. 4.

In FIG. 4, it will be seen that the piston 14C comprises a piston head 14E (having the usual piston rings) and a piston body 14B, the body including the usual piston skirt. In this embodiment, the skirt extends to the bottom of the piston body in the regions of the axial plane perpendicular to the wrist pin. However, the skirt is cut away at the lateral sides of the piston up to the level of the entrance passageways of the transfer ports, as clearly appears in the drawings. The body 14B of the piston is specially shaped to have lateral side portions spaced inwardly from the periphery of the piston head 14E, as clearly appears in FIG. 4, in order to leave substantial space between the lateral sides of the piston body and the adjacent side surface areas of the cylinder, i.e., the areas of the cylinder in which the intake ports 45 are provided. The wrist pin 14D is mounted, as indicated in FIG. 4, in a position so that the "flattened" sides of the piston body are located toward opposite ends of the wrist pin.

By virtue of this configuration, the intake ports 45 have free communication to the space below the piston at all times. However, it is to be noted that this additional intake porting is provided in a manner which does not reduce the surface area of the cylinder in the plane at right angles to the axis of the wrist pin, which is the plane in which maintenance of maximum guiding of the piston in the cylinder is important. This also minimizes cylinder wear.

In a construction such as described above in connection with FIGS. 1 to 4 inclusive, it is also contemplated that the total area of the intake ports at the side of the cylinder adjacent to the valves and intake passages be reduced, thereby maximizing cylinder surface in the region in which the guiding action of the piston is of maximum importance. Indeed, if desired, the intake ports through the cylinder wall directly adjoining the valves and fuel supply passages may even be eliminated.

Figure 7:
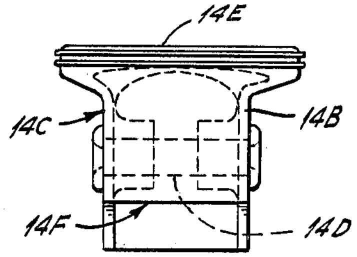
Figure 6:
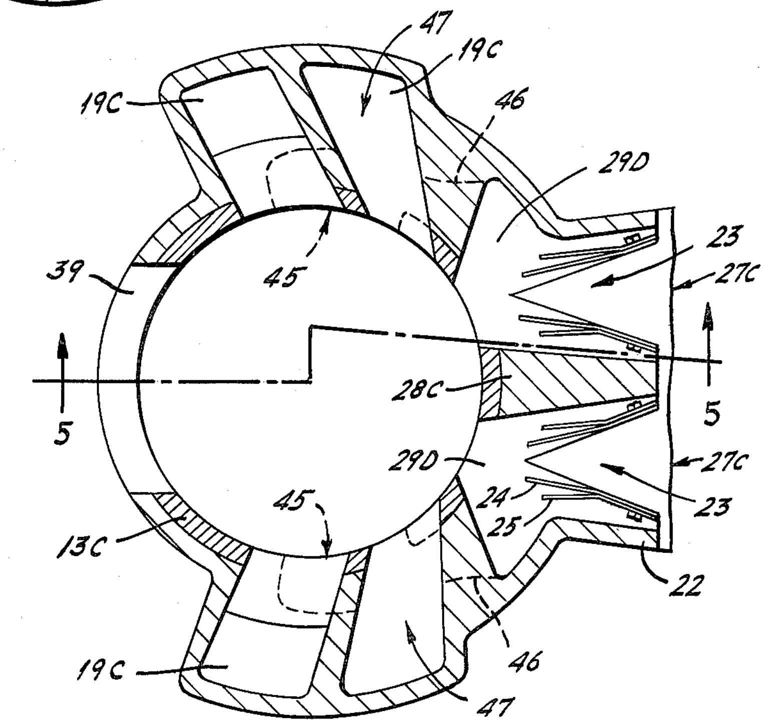

FIGS. 5 to 7

The embodiment shown in FIGS. 5 to 7 incorporates most of the structure described above in connection with FIGS. 1 to 4; but in addition, the embodiment of FIGS. 5 to 7 includes some additional passage means providing intercommunication between the intake tract and one of the transfer passages at each side of the cylinder. Thus, in the region indicated by the reference numbers 47–47 in FIG. 6, a passage or port is provided in the engine housing structure in a position providing intercommunication between the passage 46 and one of the transfer passages 19C at each side of the cylinder.

The embodiment of FIGS. 5, 6 and 7 also differs from the embodiment of FIGS. 1 to 4 inclusive in another respect. Thus, whereas in FIGS. 1 to 4, the cylinder liner 13C is cut away within the wall portion 42 of the engine housing structure in order to provide extended intake at the side presented toward the valves, in the embodiment of FIGS. 5 to 7, the intake passages 29D are not extended as far downwardly as in the first embodiment. The cylinder liner is retained in the region marked 13D below the level of the valves 23. This provides smaller total intake port area presented toward the valves in the embodiment of FIGS. 5 to 7, as compared with the embodiment of FIGS. 1 to 4, in the region where the support and guiding of the piston is of particular importance.

In the embodiment of FIGS. 5, 6 and 7, the configuration of the piston is also somewhat different from that shown in FIGS. 1 to 4. Thus, the skirt portion of the piston body is cut away not only at the lateral sides but also in the region indicated at 14F, at the side of the piston presented toward the valves, as clearly appears in FIGS. 5 and 7. This provides for increase in the percentage of the stroke of the piston during which time intake ports 29D are open to the space below the piston as compared with the interval during which the intake ports would be open if the piston skirt were not cut away.

In other respects, the arrangement of FIGS. 5 to 7 inclusive is essentially the same as in FIGS. 1 to 4 inclusive.

As above indicated, the provision of the intake porting at the lateral sides of the piston, i.e., in the axial plane containing the axis of the wrist pin 14D, makes possible extensive increase in the overall intake area through the cylinder wall, without impairing the guiding and supporting action of the piston by the cylinder in the plane where the support is of greatest importance, i.e., in the axial plane perpendicular to the axis of the wrist pin.

In connection with the references herein to the crankcase and the cylinder, and to the location of various ports and passages, it should be kept in mind that a portion of what is functionally the wall of the cylinder is often (for instance as shown in the drawings) actually located within the confines of the metal of the crankcase casting.

Moreover, various of the ports and passages provided in two-cycle engines, including intake porting and passages and transfer porting and passages, are quite often extended from a region lying within the metal of the cylinder casting into a region lying within the metal of the crankcase casting, or vice versa. From the standpoint of the operation and functioning of the various ports and passages, and the operation and functioning of the engines as a whole, it is not significant just where the parting line occurs separating the metal of the "cylinder" from the metal of the "crankcase", nor is it of any significance just which part of the metal of which part of the engine is traversed by some particular passage.

I claim:

1. A variable speed, two-cycle crankcase compression, internal combustion engine, comprising: engine housing structure including a cylinder and a crankcase, a piston having a head and a body mounted for reciprocation in the cylinder between top and bottom dead center positions, at least one transfer passage in the engine housing structure having an opening in communication with the crankcase and having an opening in communication with the cylinder above the piston head in bottom dead center position, a fuel intake chamber for receiving fuel from a supply source, reed valve means for controlling the flow of fluid through the intake chamber, and passage means formed in the engine housing structure and communicating with the intake chamber downstream of the reed valve means, the passage means including intake porting in the cylinder wall in the bottom dead center position of the piston and providing for substantially direct flow of fuel from the reed valve means into the space below the level of the lower edge of the piston at the side presented toward the porting when the piston rises substantially above the bottom dead center position, the passage means further including additional porting in the cylinder wall circumferentially offset from said intake porting and located axially of the cylinder in a position presented toward the bottom dead center position of the piston body, and the piston body being spaced from the cylinder wall in the region of said additional porting to provide a passage between the piston and the cylinder extended downwardly and communicating with the crankcase even when the piston is in bottom dead center position.

2. An engine as defined in claim 1 in which said passage means in the engine housing structure still further includes porting in the cylinder wall above the piston head in bottom dead center position of the piston.

3. An engine as defined in claim 2 in which said passage means still further includes a portion interconnecting said porting in the cylinder wall above the piston head with the opening of the transfer passage above the piston head, and said interconnecting portion being located in a region closely adjacent to the piston head when the piston is in bottom dead center position.

4. A variable speed, two-cycle crankcase compression, internal combustion engine, comprising: engine housing structure including a cylinder and a crankcase, a piston mounted for reciprocation in the cylinder between top and bottom dead center positions, the piston having a head and a hollow body with bearing means for cooperation with a wrist pin having an axis lying in a plane containing the axis of the cylinder and piston, a fuel intake chamber for receiving fuel from a supply source, the fuel intake chamber being located in offset relation to said axial plane toward one side thereof, reed valve means for controlling the flow of fluid through the intake chamber in a path directed transverse to the axial plane substantially radially toward the bottom dead center position of the piston, and passage means formed in the engine housing structure and communicating with the intake chamber downstream of the reed valve means, the passage means including porting in the engine housing structure at least a part of which is in the cylinder wall in the bottom dead center position of the piston and provides for substantially direct flow of fuel substantially radially of the cylinder from the reed valve means into the space below the level of the lower edge of the piston at the side presented toward the porting when the piston rises substantially above the bottom dead center position, and the passage means further including at least one portion communicating with the fuel intake chamber throughout the piston stroke and having porting through the cylinder wall above the piston in bottom dead center position, and the passage means still further including a port through the cylinder wall in a position below the piston head but above the lower edge of the piston when the piston is in bottom dead center position, and the position of said port being in the region of the axial plane of the wrist pin, and the body of the piston below the piston head having a side wall spaced from the cylinder wall in the region of said port to provide a passage between the piston and the cylinder extended downwardly and communicating with the crankcase even when the piston is in bottom dead center position.

5. A variable speed, two-cycle crankcase compression, internal combustion engine, comprising: engine housing structure including a cylinder and a crankcase, a piston mounted for reciprocation in the cylinder between top and bottom dead center positions, the piston having a head and a hollow body with bearing means for cooperation with a wrist pin having an axis lying in a plane containing the axis of the cylinder and piston, a fuel intake chamber for receiving fuel from a supply source, the fuel intake chamber being located in offset relation to said axial plane toward one side thereof, reed valve means for controlling the flow of fluid through the intake chamber, and passage means formed in the engine housing structure and communicating with the intake chamber downstream of the reed valve means, the passage means including a port through the cylinder wall in a position below the piston head but at least in large part above the lower edge of the piston when the piston is in bottom dead center position, and the position of said port being in the region of the axial plane of the wrist pin, and the body of the piston below the piston head having a side wall spaced from the cylinder wall in the region of said port and extending downwardly to the lower edge of the body of the piston to provide a passage between the piston and the cylinder extended downwardly and communicating with the crankcase even when the piston is in bottom dead center position.

6. An engine as defined in claim 5 in which said passage means includes a port through the cylinder wall in the region of said axial plane at each side of the cylinder, and in which both side walls of the piston are spaced from the cylinder wall to provide a passage communicating with the crankcase at each side.

7. An engine as defined in claim 5 in which the passage means in the engine housing structure further includes intake porting in the cylinder wall in the region of the bottom dead center position of the piston at the side of the piston adjacent the fuel intake chamber, said porting being dimensioned and positioned axially of the cylinder so that the porting is open to the crankcase even in bottom dead center position of the piston.

8. An engine as defined in claim 5 in which the passage means in the engine housing structure further includes intake porting in the cylinder wall in the region of the bottom dead center position of the piston at the side of the piston adjacent the fuel intake chamber, said porting being dimensioned and positioned axially of the cylinder so that the porting is closed by the body of the piston when the piston is in bottom dead center position.

9. A variable speed, two-cycle crankcase compression, internal combustion engine, comprising: engine housing structure including a cylinder and a crankcase, a piston mounted for reciprocation in the cylinder between top and bottom dead center positions, the piston having a head and a hollow body with bearing means for cooperation with a wrist pin having an axis lying in a plane containing the axis of the cylinder and piston, a fuel intake chamber for receiving fuel from a supply source, reed valve means for controlling the flow of fluid through the intake chamber, and passage means formed in the engine housing structure and communicating with the intake chamber downstream of the reed valve means, the passage means having a port through the cylinder wall in a position below the piston head but at least in large part above the lower edge of the piston when the piston is in bottom dead center position, and said port communicating with said fuel intake chamber and the position of said port being in the region of the axial plane of the wrist pin, and the body of the piston below the piston head having a side wall spaced from the cylinder wall in the region of said port and extending downwardly to the lower edge of the body of the piston to provide a passage between the piston and the cylinder extended downwardly and communicating with the crankcase even when the piston is in bottom dead center position.

10. An engine as defined in claim 9 and further in which a flow passage is provided in the engine housing structure intercommunicating with the intake chamber and said port.

11. An engine as defined in claim 10 and including a fuel transfer passage between the crankcase and the cylinder when the piston is in bottom dead center position, and a passage interconnecting the transfer passage with said flow passage.

* * * * *